(12) United States Patent
Zeng

(10) Patent No.: US 8,712,663 B1
(45) Date of Patent: Apr. 29, 2014

(54) SYSTEMS AND METHODS FOR VEHICLE CRUISE CONTROL

(71) Applicant: GM Global Technology Operations LLC, Detroit, MI (US)

(72) Inventor: Shuqing Zeng, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/664,681

(22) Filed: Oct. 31, 2012

(51) Int. Cl.
*B60T 8/32* (2006.01)
(52) U.S. Cl.
USPC .................................................. 701/93
(58) Field of Classification Search
CPC ............. B60K 31/00; B60T 8/32; B60T 7/12;
B60W 30/14; B60W 10/18
USPC ............ 701/36, 70, 91, 93, 96, 116, 118, 119
See application file for complete search history.

(56) References Cited

U.S. PATENT DOCUMENTS

| | | | |
|---|---|---|---|
| 6,285,923 B1* | 9/2001 | Matsuda et al. ............... | 701/1 |
| 6,990,401 B2 | 1/2006 | Neiss et al. | |
| 2010/0198477 A1* | 8/2010 | Shirai .......................... | 701/96 |
| 2010/0204896 A1* | 8/2010 | Biondo et al. ............... | 701/93 |

* cited by examiner

*Primary Examiner* — Kim T Nguyen
(74) *Attorney, Agent, or Firm* — Parks IP Law LLC; Stephen J. Terrell

(57) ABSTRACT

An exemplary cruise control system includes an application that integrates curvature speed control, speed limit control, and adaptive speed control and generates an optimized speed profile that is used to control the vehicle.

20 Claims, 5 Drawing Sheets

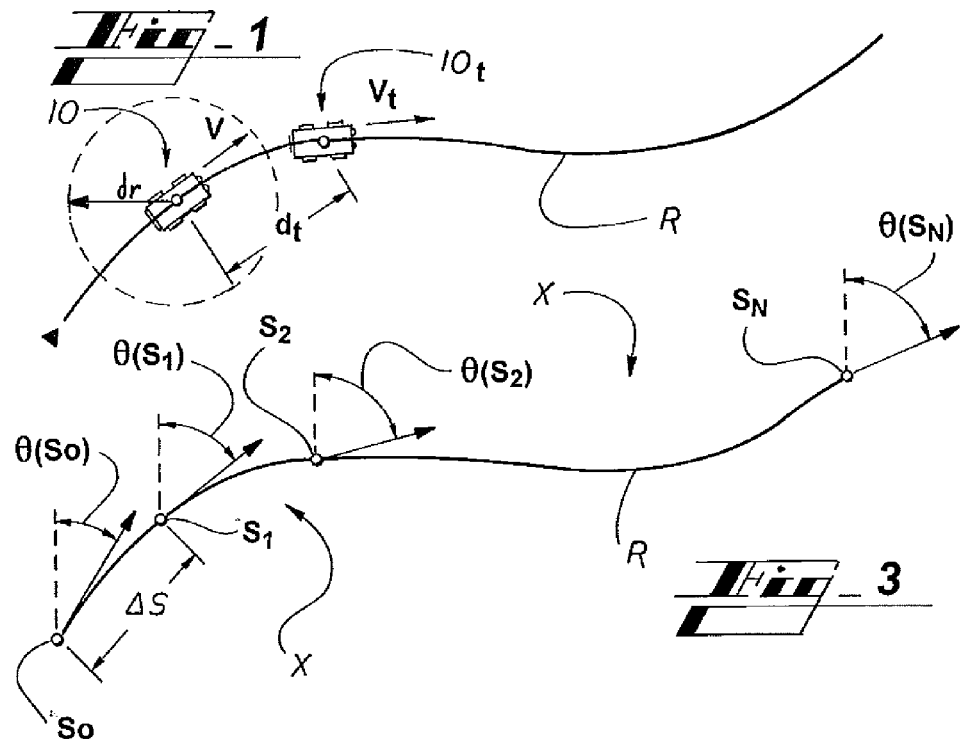
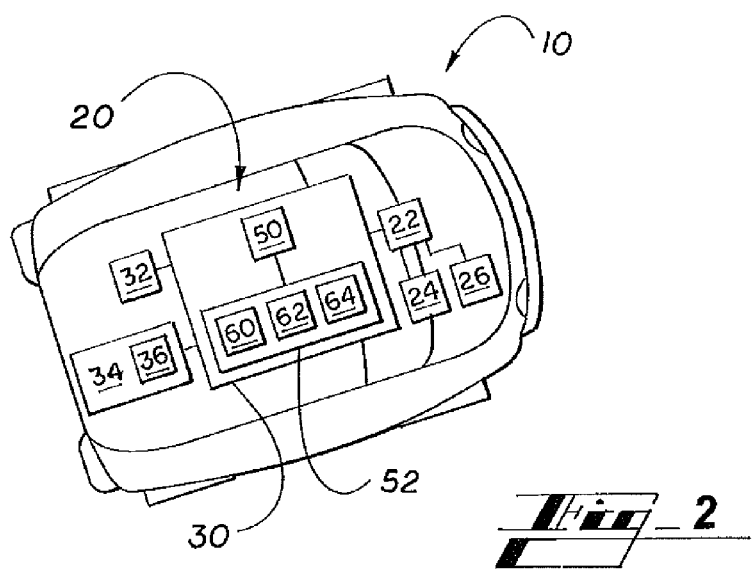

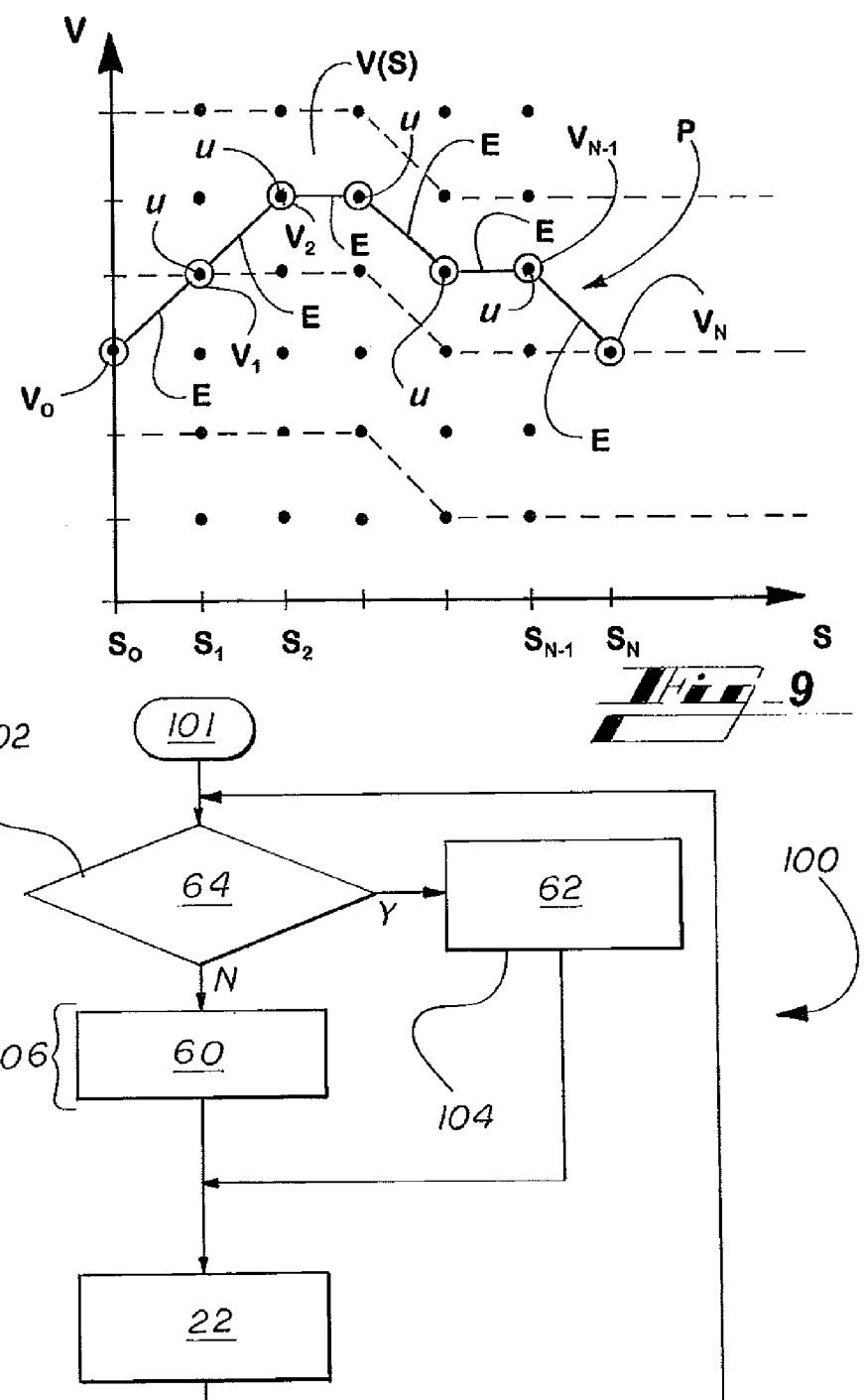

SYSTEMS AND METHODS FOR VEHICLE CRUISE CONTROL

TECHNICAL FIELD

The technical field is generally systems and methods for controlling a vehicle and more specifically systems and methods for vehicle cruise control.

BACKGROUND

Current cruise control systems are not adapted to handle various situations including entering a curve, leaving a curve, navigating a curve, and encountering a vehicle. For example, certain current cruise control systems run adaptive cruise control and curvature speed control in parallel with an arbitration module selecting between the controls. Such cruise control systems can exhibit jerkiness during the transition between one type of control and another.

SUMMARY

The various embodiments overcome the shortcomings of the prior art. Systems and methods described herein provide a cruise control system that automatically and optimally adapts to various situations while maintaining the comfort of the driver. Various situations include navigating a curve and encountering a vehicle. Generally described, an exemplary cruise control system includes an application that integrates curvature speed control, speed limit control, and adaptive speed control and generates an optimized speed profile that is used to control the vehicle. For example, the speed profile is a function of positions along a path, headings at the positions, speed limit at the positions, and the distance and speed of one or more proximate vehicles.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION OF THE DRAWINGS

FIG. 1 is a plan view of a vehicle and a proximate vehicle, each traveling along a road, according to an exemplary embodiment.

FIG. 2 is a schematic view of the vehicle of FIG. 1 illustrating a cruise control system.

FIG. 3 is a plan view of the road of FIG. 1 illustrating locations on the road and heading at the locations.

FIG. 9 is a graphical illustration of an exemplary speed profile.

FIG. 10 is a diagram of an exemplary method for selecting an application.

DETAILED DESCRIPTION

Figure 4:
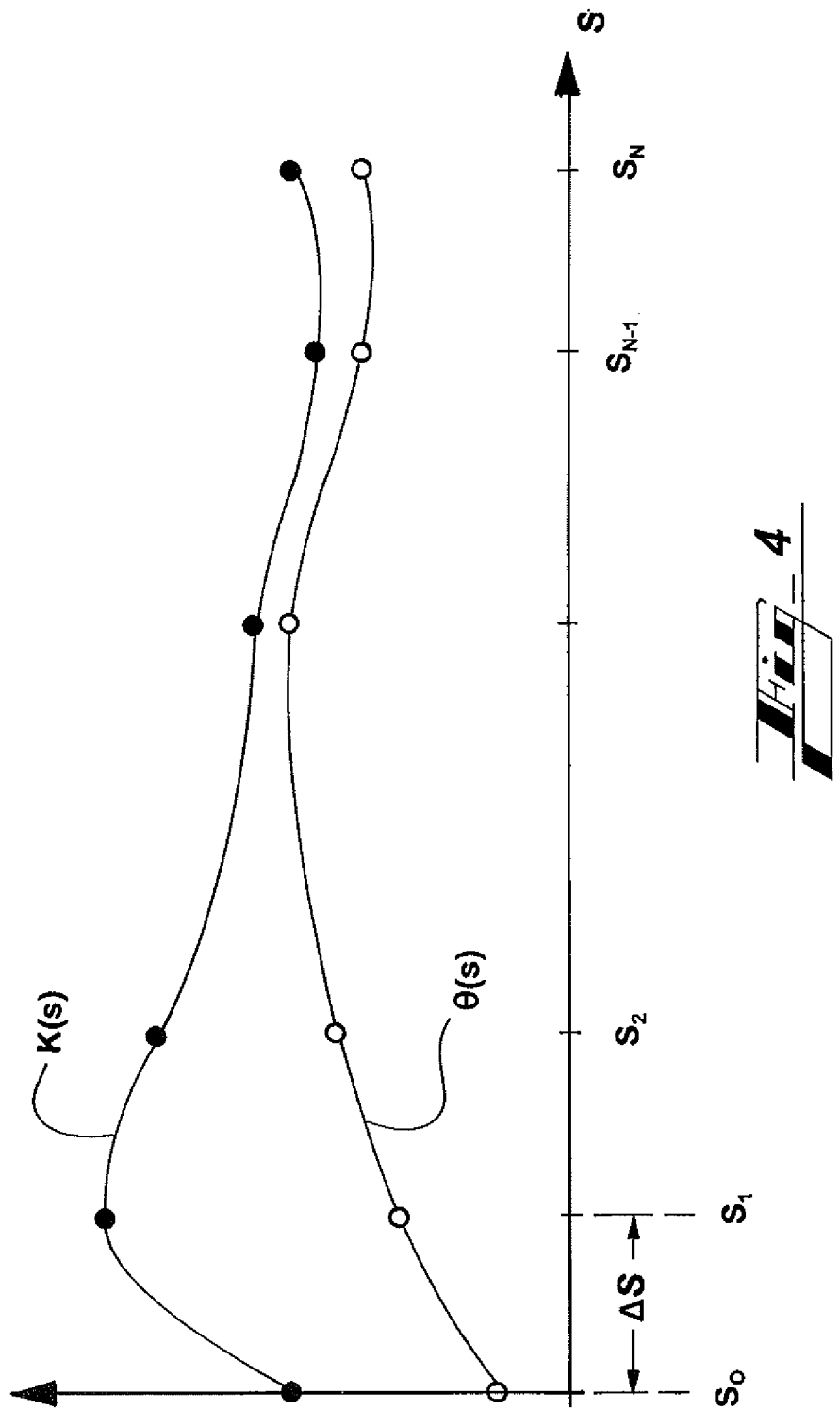
FIG. 4 is a graphical illustration of heading and curvature at the locations of FIG. 3.

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are know to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Referring to FIGS. 1-3, a vehicle 10 includes a cruise control system 20 configured to automatically control the speed v of the vehicle 10 at locations s along a road R that includes curves X. For example, the cruise control system 20 provides a command to a vehicle throttle/brake controller 22. The throttle/brake controller 22 is configured to control a throttle system 24 of the vehicle 10 and a brake system 26 of the vehicle 10.

The cruise control system 20 includes a speed controller 30 configured to generate a command for the throttle/brake controller 22. For purposes of teaching, a single controller is described. However, in some embodiments multiple controllers are used. For example, a first controller determines first command using a first application, a second controller determines a second command using a second application, and the cruise control system selects which command is forwarded to the throttle/brake controller 22. Further, in some embodiments the throttle/brake controller 22 is integrated into the cruise control system 20.

The cruise control system 20 also includes sensors that are configured to measure data and input the data to the speed controller 30. The cruise control system 20 also includes a speed and distance sensor, such as a radar headway sensor 32, that is configured to measure speed $v_t$ of and distance dt to one or more proximate vehicles 10t. In alternative embodiments, multiple sensors independently measure speed and distance of proximate vehicles and provide measurement data to a processor. The radar headway sensor 32 has a range and a threshold distance dr is selected within that range. For example, the threshold distance dr may be one hundred and twenty meters or the maximum detection range of the radar headway sensor 32.

The cruise control system 20 includes a positioning sensor, such as a global positioning system (GPS) sensor 34 (i.e., a GPS device), that is configured to determine locations s, the heading θ(s) of the vehicle 10 at the locations s on the curve X, current speed $v_0$, and current location $s_0$, among other things. For example, the GPS device 34 stores or wirelessly accesses a digital map 36 to determine the locations s, heading angles θ(s), speed limit $v_L(s)$, and other information (see FIGS. 3 and 4). As an example, the speed limit is the posted government speed limit for the area or similar.

In some embodiments, the cruise control system 20 includes a longitudinal speed sensor (e.g., vehicle dynamic sensors or wheel encoders) configured to measure the current speed $v_0$ of the vehicle 10. Alternatively, the functions of the GPS device are performed at least in part by the processor of the cruise control system. For example, the memory 52 stores the headings which are accessed according to the location determined by the GPS sensor 34.

Referring to FIG. 2, generally described, the vehicle speed controller 30 is configured to receive input from the sensors 32, 34 and generate a command for the throttle/brake controller 22 to control the speed of the vehicle 10. The controller 30 includes a processor 50 and a tangible computer-readable medium or memory 52 that stores computer-executable instructions for performing the methods described herein. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

While the methods described herein may, at times, be described in a general context of computer-executable instructions, the methods of the present disclosure can also be implemented in combination with other applications and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The memory 52 includes a speed optimization application 60 that is configured to coordinate adaptive speed control, curvature speed control, and speed limit control. The speed optimization application 60 uses input from the sensors 32, 34 to optimally generate the speed profile v(s) and generates a speed command based on the speed profile v(s).

The memory 52 also includes an adaptive cruise control application 62 that is configured to apply adaptive speed control. The adaptive cruise control application 62 uses input from the radar headway sensor 32 to generate a speed command as a function of a closest in path vehicle $10t$. The closest in path vehicle $10t$ is one of the proximate vehicles $10t$, is closest to the vehicle 10, and is closer than the threshold distance dr.

The memory 52 also includes a selection application 64 that is configured to select between the speed command of the speed optimization application 60 and the speed command of the adaptive cruise control application 62. The selected speed command is sent to the throttle/brake controller 22.

Adaptive speed control, curvature speed control, and speed limit control are now described in further detail. Adaptive speed control is control of the speed v of the vehicle 10 relative to one or more proximate vehicles $10t$ on the road R proximate the vehicle 10 (as illustrated in FIG. 1). To perform adaptive speed control, the radar headway sensor 32, or other vehicle device, measures speed $v_t$ of and distance dt to one or more proximate vehicles $10t$. A target flow velocity $v_{tf}$ can be determined from measurements of multiple proximate vehicles $10t$ as described in further detail below.

Curvature speed control is control of the speed v of the vehicle 10 as the vehicle 10 moves through a curve X. To perform curvature speed control, the global positioning system (GPS) device 34 determines locations s on the curve X and the heading $\theta(s)$ of the vehicle 10 at the locations s on the curve X.

Speed limit control is control of the speed v of the vehicle 10 relative to the speed limit $v_L$. To perform speed limit control, the GPS device 34 determines the speed limit $v_L(s)$ at the locations s along the road R.

Speed Optimization Application

According to an exemplary embodiment, the speed optimization application 60 includes computer executable instructions for minimizing the following expression:

$$\min_{v(s)} \int_0^S \left\{ C_1 \frac{1}{v(s)} + C_2 \left| v(s) \frac{dv(s)}{ds} \right| + C_3[k(s)(v(s)^2 - v_L(s)^2] + C_4 H(v(s)) \right\} ds \quad \text{(equation 1)}$$

and satisfying the following constraints:

$$\left| \frac{dv(s)}{ds} \right| < a_m \quad \text{(equation 2)}$$

and $$|v(s) - v_L(s)| \le \epsilon \quad \text{(equation 3)}$$

to determine the speed profile v(s) for a set of locations $$s \in [0, S]$$

represented by the arc length parameter S. Alternatively, equation 3 could be $$v(s) \le v_L(s) + \epsilon,$$

which sets an upper limit.

Equation 1 is described in further detail below. Regarding the constraints of equations 2 and 3, maximum acceleration $a_m$ is an acceleration value that represents a performance capacity of the vehicle 10. For example, maximum acceleration $a_m$ is in one embodiment forty percent of gravitational acceleration for positive acceleration and sixty percent of gravitational acceleration for deceleration. Tolerance $\epsilon$ is an acceptable deviation from the speed limit $v_L$. For example, Tolerance $\epsilon$ can be ten miles per hour on highways and five miles per hour on local roads. Typically, tolerance $\epsilon$ is a relatively small positive number.

Equation 1 includes sub-expressions (equations 4, 5, 6, and 8 below) that represent the relevant factors including the desire to quickly move through the road R, the comfort of the driver, compliance with the speed limit, and the desire to maintain the same speed as the sensed speed of traffic flow. The sub-expressions are weighted by constants $C_1, C_2, C_3, C_4$ according to their relative importance.

The coefficients $C_1, C_2, C_3, C_4$ in equation 1 are weight factors that can be calibrated via test runs. The coefficients $C_1, C_2, C_3, C_4$ determine the weight of the sub-expressions in the minimization in equation 1. The larger the weight factor, the more contribution from the corresponding sub-expression in the minimization of equation 1. In the sub-expressions, the coefficients $C_1, C_2, C_3, C_4$ are set to one or are otherwise omitted for clarity.

The first sub-expression $$\int_0^S \frac{1}{v(s)} ds \quad \text{(equation 4)}$$

is the time to get through the set of locations $$s \in [0, S],$$

which is minimized by maximizing the speed profile v(s).

The second sub-expression $$\int_0^S \left| v(s) \frac{dv(s)}{ds} \right| ds \quad \text{(equation 5)}$$

is the accumulated longitudinal acceleration through the set of locations $$s \in [0, S],$$

which is minimized by maintaining a constant speed v.

The third sub-expression $$\int_0^S k(s)(v(s)^2 - v_L(s)^2) ds \quad \text{(equation 6)}$$

is the accumulated lateral acceleration. Referring to FIGS. 3 and 4, the curvature k(s) given as $$k(s) = \left| \frac{d\theta(s)}{ds} \right| \quad \text{(equation 7)}$$

and thus is a function of heading angle $\theta(s)$. The heading angle $\theta(s)$ is the angle of the line that is tangent to the road R at location s. The posted legal speed limit $v_L(s)$ is derived from the digital map 36. The third sub-expression is zero along a straight section of the road R and is minimized by maintaining the speed v at the posted legal speed limit $v_L$ along a curve X. The accumulated longitudinal acceleration and lateral acceleration represent the discomfort of the driver and any passengers of the vehicle 10 along the road R.

The fourth sub-expression $$\int_0^S H(s) ds \quad \text{(equation 8)}$$

is accumulated deviation from the sensed traffic flow velocity $v_{tf}(s)$. Here, deviation from traffic flow velocity H(s) is defined as $$H(s) = |v(s) - v_{tf}(s)| \quad \text{(equation 9)}.$$

The traffic flow velocity $v_{tf}(s)$ can be set by the driver or computed, e.g., by the processor 50 executing the instructions 52, by interpolation of speeds of a list of proximate vehicles 10t detected by the radar headway sensor 32. For example, a list of proximate vehicles is given by $$v_t(s_j), s_j), j=1, 2, \ldots, M.$$

To interpolate the speed of a list of proximate vehicles, the list of proximate vehicles $(v_t(s_j), s_j)$ is first sorted by the distance to the ego (e.g., lead) vehicle at a location $s_j$. For example, given the location s of the subject vehicle 10 and locations $s_0$, sj of proximate vehicles 10t where $s_{j-1} \leq s < s_j$, the interpolated traffic flow velocity vas) can be computed as follows:

$$v_{tf}(s) = \frac{s - s_{j-1}}{s_j - s_{j-1}} v_t(s_{j-1}) + \frac{s_j - s}{s_j - s_{j-1}} v_t(s_j) \quad \text{(equation 10)}$$

Numerical Techniques

Numerical techniques such as calculus of variances can be used to find the minimum of equation 1 while meeting the constraints of equations 2 and 3. For purposes of teaching, the above equations are discretized and an optimal minimum is determined using a Trellis graph (see FIG. 4). The arc length variable s becomes discretized permissive locations ($s_1$, $s_2$, ..., $s_N$). The optimization determines velocities $v_i$, for t=1, ..., N, at these discrete locations $s_i$. The discretized version of equations 1, 3, and 7 are given as $$\sum_{i=1}^{N} \left\{ C_1 \frac{\Delta s}{v_i} + C_2 \left| v_i \frac{v_i - v_{i-1}}{\Delta s} \right| + C_3 [k_i(v_i^2 - v_L^2)] + C_4 H(v_i) \right\} \quad \text{(equation 11)}$$

with $$k_i = \frac{\theta_i - \theta_{i-1}}{\Delta s}. \quad \text{(equation 12)}$$

The discretized versions of the constraints of equations 2 and 3 are given as $$\left| v_i \frac{v_i - v_{j-1}}{\Delta s} \right| \leq a_m \quad \text{(equation 13)}$$

and $$|v_i - v_{Li}| \leq \epsilon \text{ (or } v_i \leq v_{Li} + \epsilon) \quad \text{(equation 14)}$$

Index i=1, 2, ..., N represents each location $s_i$ considered, the speed $v_i$ at each location $s_i$, and the curvature $k_j$ of the road at each location $s_i$. Discretized speeds $v_i$ are a discretized version of the speed profile v(s). Interpolation can be used to determine the speed profile v(s) from the discretized speeds $v_i$. Number N is the number of locations $s_i$ or discretized speeds $v_i$ to be considered in determining the speed profile v(s).

Figures 5, 6:
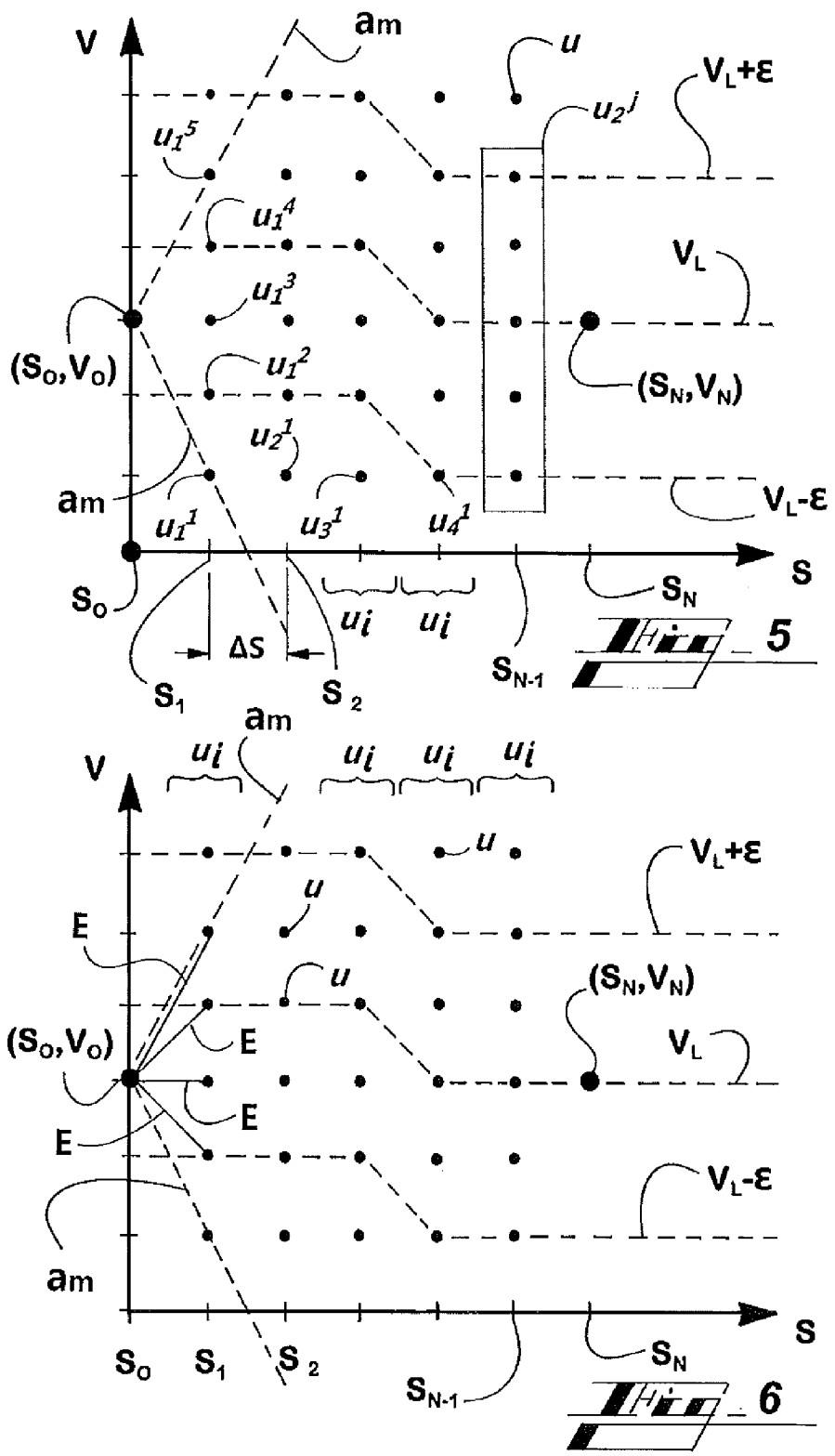
FIG. 5 is a graph used to determine a speed profile, the graph including a set of speeds for each of the locations of FIG. 3.
FIGS. 6-8 show the graph of FIG. 5 with steps of an exemplary method for determining a speed profile.

Referring to FIGS. 3 and 5, adjacent locations $s_i$ are separated by a segment distance $\Delta s = s_i - s_{i-1}$. The locations $s_i$ approximate the road R. Headings $\theta(s_i)$ and curvature $k_j$ approximate the curve X derived from the digital map 36. Referring to FIG. 4, changes in heading $\theta(s_i)$ and curvature $k_i$ are shown for each location $s_i$.

Trellis Graph

Referring to FIG. 5, the Trellis graph G is described in further detail. The Trellis graph G includes a matrix of vertically sliced nodes. Each nodes represents a velocity at a location. The term "node" is used to distinguish velocities that are used in the optimization from the other uses of the term velocity herein.

For purposes of teaching, with reference to FIG. 5, the subscript "i" of a node u represents a set of nodes in a column or "slice." Nodes $u_i$, for t=1, ..., N, represent discrete values for speeds $v_i$ at the locations $s_i$ that are used in the optimization.

The method described herein selects one of the nodes from a node slice $u_i$ to be the optimal speed $v_i$ at the corresponding location $s_i$. For purposes of teaching, a superscript is used to indicate a subset of nodes in a node slice. As used herein, the subset of nodes are referred to as "permissive" nodes since they satisfy the constraints of equations 13 and 14. Different superscripts are used to represent that the permissive nodes in different node slices are not necessarily the same. For example, nodes $u_i^j$ (e.g., i=2, j=3, 4, 5; also, see FIG. 5) indicates permissive speeds at a location $s_i$. An optimal speed $v_i$ at a location $s_i$ is selected from the permissive nodes u.

The start and end speeds $v_0$, $v_N$ at the start and end locations $s_0$, $s_N$ of the Trellis graph G are determined prior to determining the speeds $v_i$ at locations $s_i$ therebetween (e.g., i=1 ... N−1). The value of the current speed $v_0$ can be determined as described above, e.g., by vehicle dynamic sensors 38 such as wheel encoders or by the GPS device 34. The value of the end location speed $v_N$ can be any positive value that satisfies the constraints of equations 13 and 14. For example, the end location speed $v_N$ can be the speed limit $v_L$ at the end location $s_N$.

Paths and Edges

Referring to FIGS. 5-9, paths P through the Trellis graph G represent possible speed profiles v(s). Each path P includes a node u in each vertical slice and the nodes u in adjacent vertical slices are connected by edges E.

Specifically, nodes (e.g., $u_{i-1}^j$, $u_i^k$) in two adjacent vertical slices that satisfy the conditions of equations 13 and 14 are linked by an edge E (i.e., edges connect permissive nodes in adjacent vertical slices). In FIGS. 5-8, the conditions of equations 13 and 14 are shown by dashed lines and edges E are shown by solid lines.

According to an exemplary method, edges E are defined between permissive upstream nodes u in a lower numbered vertical slice (e.g., i−1) and permissive downstream nodes u in an adjacent higher-numbered vertical slice (e.g., i) that satisfy the constraints of equations 13 and 14. Then, the step is applied to the next higher-numbered adjacent vertical slices (e.g., i, i+1) using permissive nodes u to which an edge E is attached. Edges do not connect nodes in the same vertical slice.

Figure 7:
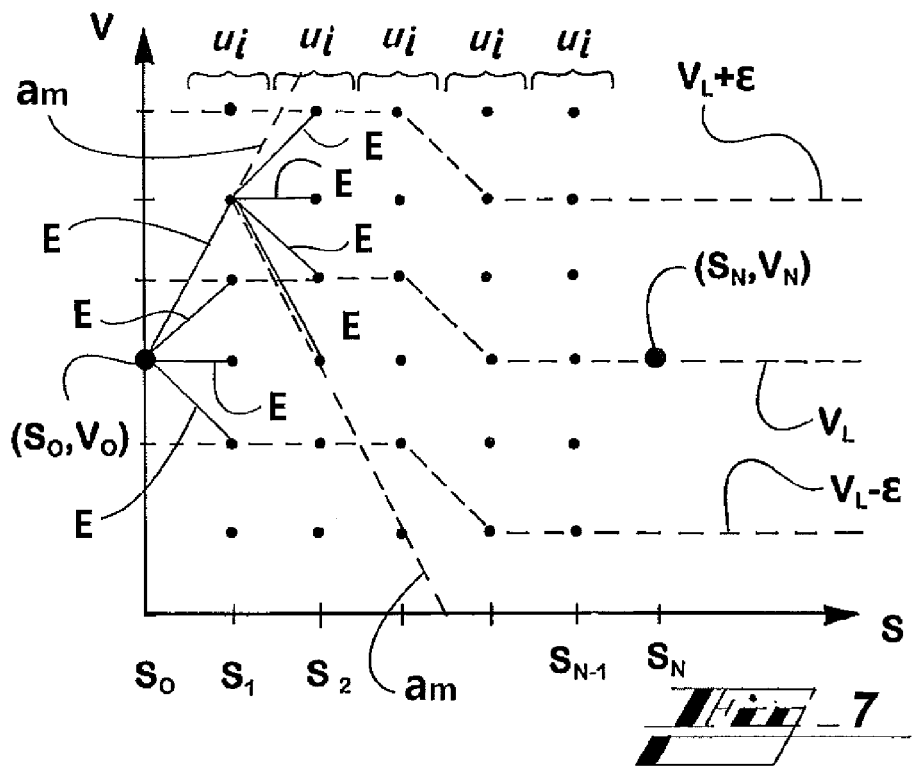
Figure 8:
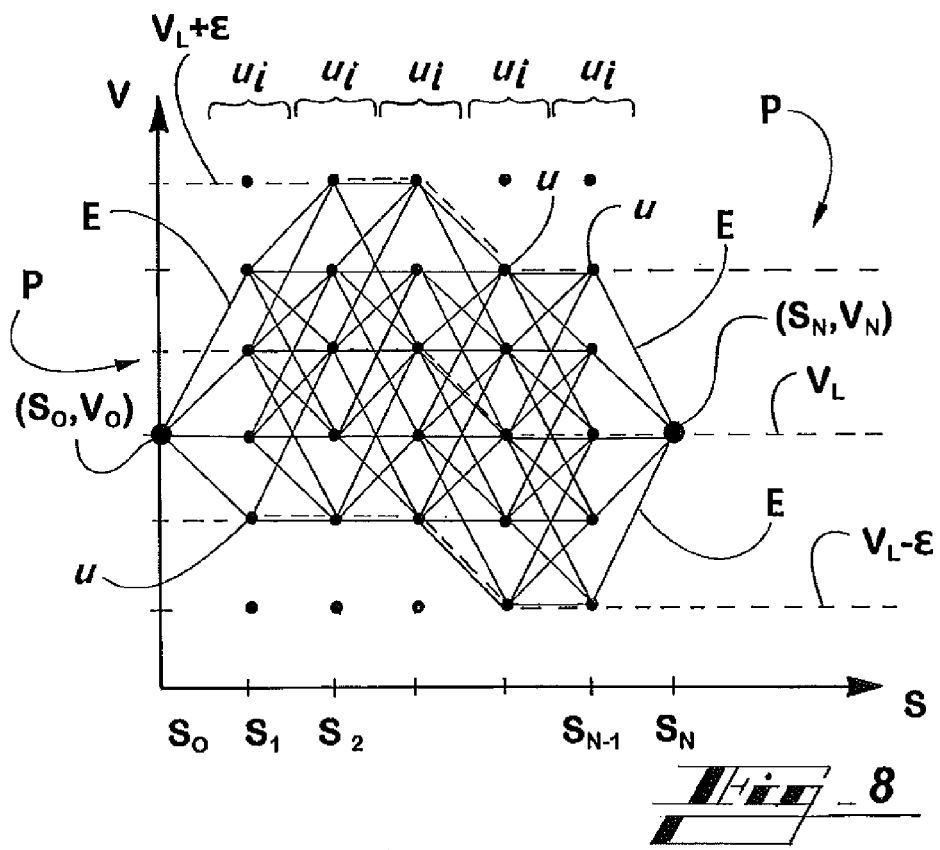

Specifically, referring to FIG. 6, an exemplary method includes defining edges E between the current speed $v_0$ at the start location $s_0$ and permissive downstream nodes u in the vertical slice of location $s_1$ where the conditions of equations 13 and 14 are satisfied. Referring to FIG. 7, the step is repeated for a permissive node u in the vertical slice of location $s_1$ such that edges E are defined between the permissive node u in the vertical slice of location $s_1$ and permissive downstream nodes u in the vertical slice of location $s_2$. The exemplary method includes defining the edges E between other permissive nodes u in the vertical slice $s_1$, which are connected to the current speed $v_0$ in the previous step, and permissive nodes u in the vertical slice of location $s_2$. Of note is that the constraint of equation 13 is applied relative to the upstream node u. All other edges E are similarly defined resulting in the connections shown in FIG. 8.

The paths P between the current speed $v_0$ and the end speed $v_N$ include a permissive node u in each of the vertical slices. The nodes u of a path P are connected one to the next by edges E. Each path P represents a set of discretized speeds that may be selected. For purposes of teaching, a collection π of paths P through the Trellis graph G from the start speed $v_0$ to the end speed $v_N$ is defined as $$\pi(G; v_0, v_N) = \quad \text{(equation 15)}$$
$$\left\{ (u_0, u_1^{k_1}, \ldots, u_{N-1}^{k_{N-1}}, u_N) | \left(u_i^{k_i}, u_{i+1}^{k_{i+1}}\right) \in E, u_i^{k_i} \in s_i \right\}$$

Here, a path, starting from node $u_0$ and ending at the node $u_N$, is a set of nodes u across the locations $s_1, s_2, \ldots, s_{N-1}$ of the trellis graph G subsequently. The notation $$\left(u_i^{k_i}, u_{i+1}^{k_{i+1}}\right) \in E$$

is a condition that two nodes $u_i^{k_i}$ and $u_{i+1}^{k_{i+1}}$ from adjacent vertical slices (i and i+1) are linked by an edge E for i=0, ..., N−1. The notation $$u_i^{k_i} \in s_i$$

is a condition that the node $u_i^{k_i}$ belongs to the vertical slice of location $s_i$. All permissive paths P include a set of nodes u that meets these conditions.

Cost of Path

To determine which path P to use, the cost of each path P is determined. The path P with the lowest cost is used to generate the velocity profile v(s). The cost of each path P is determined as a function of the cost of the nodes u and the cost of the edges E included in each path P.

Each node $u_i^k$, corresponding to the permissive velocity $v_i^k$ (here, velocity is used since the value is used in the equation) in the i-th vertical slice, for i=0, ..., N−1, has a cost value c defined as $$c(u_i^k) = C_1 \left[\frac{1}{v_i^k}\right] + C_3 \left[k_i \left((v_i^k)^2 - v_{Li}^2\right)\right] + C_4 H(v_i^k) \quad \text{(equation 16)}$$

where $$H(v_i^k) = |v_i^k - v_t(s_i)| \quad \text{(equation 17)}$$

and $v_t(s_i)$ is the interpolated traffic flow speed at distance $s_i$. The cost value c of each of the current and end speeds $v_0$, $v_N$ is zero.

The cost value c of an edge E from node $u_{i-1}^j$ and $u_i^k$ is defined as $$c(u_{i-1}^j, u_i^k) = C_2 \left| v_i^k \frac{(v_i^k - v_{i-1}^j)}{\Delta s} \right| \quad \text{(equation 18)}$$

and index i=1, ..., N−1 Each node in the vertical slice of location $s_{N-1}$ has an edge E linked to the end speed $v_N$. The cost value c of the end speed $v_N$ is defined as zero.

Applying the cost values c of the nodes u and edges E, the cost value c of a path P is then defined by $$c(u_0, u_1^{k_1}, \ldots, u_{N-1}^{k_{N-2}}, u_N) = \sum_{i=1}^{N-1} c\left(v_i^{k_i}, v_{i+1}^{k_{i+2}}\right) + c\left(v_i^{k_i}\right) \quad \text{(equaion 19)}$$

Here, the set of nodes u included in the path P are used to determine the cost value c. The minimum of equation 10 is the path P with the minimum cost value C.

Dynamic Programming

Let l(x) denote the slice number of the node x. The path P through the Trellis graph G with the minimum cost value c can be found via dynamic programming (DP) by recursively calculating d(x)

$$d(x) = \begin{cases} 0 & x = u_0 \\ \min\{d(y) + c(y, x) + c(x)\} & \text{Otherwise} \end{cases} \quad \text{(equation 20)}$$

which recursively determines the minimum cost path from starting node $u_0$ to node x. Here, y is a set of nodes satisfying the following conditions $$l(y)=l(x)-1$$

and $$(y,x) \in E$$

(i.e., there is an edge between the nodes y,x in the trellis graph G).

In summary, to determine the speed profile v(s), the dynamic programming method applied on the Trellis graph is used. For example, recursive methods such as the Dijkstra shortest path algorithm can be used to find the path with minimal cost, which corresponds to the set of speeds $v_i$ at the set of locations $s_i$ that minimize the above expression and meet the constraints. Referring to FIG. 9, the selected path P (set of speeds $v_i$ at locations $s_i$) and resulting speed profile v(s) is shown.

Speed Profile

The speed profile v(s) can be derived by interpolating the discretized speeds $v_i$ at the set of locations $s_i$ for i=1, ..., N-1. Given the speed profile v(s) in terms of position s (e.g., arc length s as the parameter), profiles for the planned vehicle position s(t), velocity v(t), and acceleration a(t) can be determined in terms of time. Vehicle position s(t) is determined by solving the following ordinary differential equation $$\frac{ds}{dt} = v(s) \quad \text{(equation 21)}$$

Velocity v(t) and acceleration a(t) are determined by taking the derivative of vehicle position s(t) and velocity v(t) with respect to time, respectively, i.e., $$v(t) = \frac{ds(t)}{dt} \quad \text{(equation 22)}$$

and $$a(t) = \frac{dv(t)}{dt} \quad \text{(equation 23)}$$

The computed vehicle position s(t), velocity v(t), and acceleration a(t) in terms of time can readily be used by the vehicle longitudinal controller.

According to an exemplary embodiment, the adaptive cruise control application 62 includes computer executable instructions for generating a command as a function of the speed $v_t$ of a closest in path vehicle 10t measured by the radar headway sensor 32. The closest in path vehicle 10t is one of the proximate vehicles 10t, is closest to the vehicle 10, and is closer than a threshold distance dr (e.g., one hundred and twenty meters). Specifically, if there is closest in path vehicle 10t detected by the radar headway sensor 32, and headway (the gap between the CIPV and ego-vehicle) is less than the threshold distance dr, the vehicle 10 is controlled by adaptive cruise control application 62.

According to an exemplary embodiment, the selection application 64 includes computer executable instructions for selecting a speed command. Particularly, the selection application 64 selects between the speed command of the speed optimization application 60 and the speed command of the adaptive cruise control application 62 according to a method 100. The selected speed command is sent to the throttle/brake controller 22.

Referring to FIG. 10, the method 100 of switching between a command generated by the speed optimization application 60 and a command generated by the adaptive cruise control application 62 is described. Moving from a starting point 101, according to a first step 102, the selection application 64 determines if a closest in path vehicle exists. If yes, according to a second step 104, the speed controller 30 selects the command generated by the adaptive cruise control application 62. Otherwise, according to a third step 106, the speed control 30 selects the command generated by the speed optimization application 60.

Example Scenarios

On a straight road R and without other traffic, the speed optimization application 60 generates a constant speed profile v(s) equal to the posted speed limit $v_L$ or driver desired set speed. On a straight road with other traffic but without a closest in path vehicle $v_t$, the speed optimization application 60 generates a speed profile v(s) similar to traffic flow velocity $v_{tf}$. Upon entering the curvature of a road R, the speed optimization application 60 generates a smooth speed profile v(s) to slow down at the curve X. Upon leaving the curvature of a road R, the speed optimization application 60 generates a smooth speed profile v(s) to speed up after passing the curve X.

The above-described embodiments are merely illustrated implementations that are set forth for a clear understanding of principles. Variations, modifications, and combinations of the above-described embodiments may be made without departing from the scope of the claims. All such variations, modifications, and combinations are included herein by the scope of this disclosure and the following claims.

What is claimed is:

1. A cruise control system, comprising:
    a positioning sensor configured to obtain a set of locations along a road;
    a distance sensor configured to measure a distance to a proximate vehicle from a controlled vehicle;
    a speed sensor configured to measure a speed of a proximate vehicle;
    a processor; and
    a memory having stored thereon computer-executable instructions comprising:
        a speed optimization application that, when executed by the processor, causes the processor to determine a speed profile, the speed profile comprising a set of speeds corresponding to the set of locations, wherein the speed profile is determined as a minimum of:
            a first sub-expression representing a time to move through the set of locations;
            a second sub-expression representing a longitudinal acceleration of the controlled vehicle at the set of locations;
            a third sub-expression representing a lateral acceleration of the controlled vehicle at the set of locations; and
            a fourth sub-expression representing an accumulated deviation from a traffic flow velocity.

2. The cruise control system of claim 1, wherein the cruise control system is configured to control the speed of the controlled vehicle according to the speed profile.

3. The cruise control system of claim 2, the memory further comprising an adaptive cruise control application configured to generate a control speed as a function of the speed of a proximate vehicle measured by the speed sensor; wherein the cruise control system is configured to control the speed of the controlled vehicle according to the control speed.

4. The cruise control system of claim 3, wherein the cruise control system is configured to control the speed of the controlled vehicle according to the control speed if a distance measured by the distance sensor is less than a threshold distance.

5. The cruise control system of claim 3, wherein the adaptive cruise control application is configured to generate the control speed as approximately the speed of the proximate vehicle measured by the speed sensor.

6. The cruise control system of claim 3, further comprising a selecting application comprising computer executable instructions that, when executed by the processor, cause the processor to:
indicate a presence of a closest-in-path proximate vehicle if a distance to a proximate vehicle measured with the distance sensor is less than a threshold distance; and
otherwise, indicate an absence of a closest-in-path proximate vehicle.

7. The cruise control system of claim 6, the selecting application further comprising computer executable instructions that, when executed by the processor, cause the processor to:
determine the indication;
control the speed of the controlled vehicle according to the control speed if the presence of a closest-in-path vehicle is indicated; and
otherwise, control the speed of the controlled vehicle according to the speed profile.

8. The cruise control system of claim 2, wherein the cruise control system is configured to control a throttle.

9. The cruise control system of claim 1, wherein the first sub-expression is a function of an inverse of the speed.

10. The cruise control system of claim 1, wherein the first sub-expression is $$\int_0^S \frac{1}{v(s)} ds$$

where s is location, S is arclength, and v(s) is the speed profile.

11. The cruise control system of claim 1, wherein the second sub-expression is a function of a derivative of speed with respect to location.

12. The cruise control system of claim 1, wherein the second sub-expression $$\int_0^S \left| v(s) \frac{dv(s)}{ds} \right| ds$$

where s is location, S is arclength, and v(s) is the speed profile.

13. The cruise control system of claim 1, wherein the third sub-expression is a function of a derivative of heading with respect to location and a difference between a square of the velocity and a square of a speed limit.

14. The cruise control system of claim 1, wherein the third sub-expression is $$\int_0^S k(s)(v(s)^2 - v_L(s)^2) ds$$

where s is location, S is arclength, and v(s) is the speed profile, $v_L(s)$ is speed limit at location, and k(s) is curvature given by $$k(s) = \left| \frac{d\theta(s)}{ds} \right|$$

where θ(s) is heading angle.

15. The cruise control system of claim 1, wherein the fourth sub-expression is a function of a difference between the traffic flow velocity and a speed of the controlled vehicle.

16. The cruise control system of claim 1, wherein the fourth sub-expression is $$\int_0^S H(s) ds$$

where H(s) is given by $$H(s) = |v(s) v_t(s)|$$

where v(s) is speed profile and $v_t(s)$ is the traffic flow velocity.

17. The cruise control system of claim 16, wherein the traffic flow velocity is an interpolation of speeds of a plurality of proximate vehicles.

18. The cruise control system of claim 1, where the speed profile is determined by minimizing a cost path through a Trellis graph, the Trellis graph including a range of speeds associated with each location.

19. The cruise control system of claim 18, wherein the path through the Trellis Graph includes nodes connected by edges.

20. The cruise control system of claim 1, wherein the cruise control system is configured to control a braking system.

* * * * *